(12) United States Patent
Iwashita et al.

(10) Patent No.: US 8,316,637 B2
(45) Date of Patent: Nov. 27, 2012

(54) EXHAUST EMISSION PURIFICATION METHOD AND EXHAUST EMISSION PURIFICATION SYSTEM

(75) Inventors: Takuro Iwashita, Fujisawa (JP); Tetsuya Murata, Fujisawa (JP); Hitoshi Satou, Fujisawa (JP); Takao Onodera, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 364 days.

(21) Appl. No.: 12/449,847

(22) PCT Filed: Jan. 15, 2008

(86) PCT No.: PCT/JP2008/050335
§ 371 (c)(1),
(2), (4) Date: Aug. 31, 2009

(87) PCT Pub. No.: WO2008/108107
PCT Pub. Date: Sep. 12, 2008

(65) Prior Publication Data
US 2010/0089032 A1    Apr. 15, 2010

(30) Foreign Application Priority Data
Mar. 2, 2007  (JP) ................................ 2007-052973

(51) Int. Cl.
*F01N 3/00*   (2006.01)
(52) U.S. Cl. .......................................... 60/295; 60/311
(58) Field of Classification Search .................... 60/285, 60/295, 297, 311
See application file for complete search history.

(56) References Cited

U.S. PATENT DOCUMENTS

| | | | |
|---|---|---|---|
| 4,884,398 A | 12/1989 | Morita et al. | |
| 2003/0182936 A1 | 10/2003 | Kitahara | |
| 2005/0055999 A1* | 3/2005 | Inou et al. | 60/39.6 |
| 2005/0217252 A1* | 10/2005 | Sato et al. | 60/295 |
| 2005/0223701 A1* | 10/2005 | Sato et al. | 60/295 |
| 2006/0000201 A1* | 1/2006 | Iizuka et al. | 60/286 |
| 2008/0092529 A1* | 4/2008 | Haga et al. | 60/286 |
| 2008/0163609 A1* | 7/2008 | Satou et al. | 60/287 |
| 2008/0276604 A1* | 11/2008 | Hosaka | 60/295 |

FOREIGN PATENT DOCUMENTS

| | | |
|---|---|---|
| EP | 1 582 720 | 10/2005 |
| EP | 1 584 808 | 10/2005 |

(Continued)

OTHER PUBLICATIONS

Extended European Search Report dated Jan. 24, 2011, in Application No. 08703199.3.
Patent Abstracts of Japan, Publication No. 2005-155444, Published Jun. 16, 2005.
Patent Abstracts of Japan, Publication No. 2003-155914, Published May 30, 2003.

(Continued)

*Primary Examiner* — Thomas Denion
*Assistant Examiner* — Patrick Maines
(74) *Attorney, Agent, or Firm* — Staas & Halsey LLP

(57) ABSTRACT

In emergency regeneration, i.e., after a judgment is made that purification is insufficient after ending forced regeneration, forced regeneration has expired before completion, or when a pressure difference across a diesel particulate filter exceeds a predetermined first judging pressure difference when traveling distance of a vehicle is shorter than a predetermined distance, an alarm for urging manual regeneration is issued. When manual regeneration is designated thereafter by the vehicle's user, manual regeneration is performed. When predetermined conditions are satisfied before receiving a designation of manual regeneration, automatic regeneration is performed.

12 Claims, 3 Drawing Sheets

FOREIGN PATENT DOCUMENTS

| | | |
|---|---|---|
| EP | 1 840 349 | 10/2007 |
| JP | 03-233125 | 10/1991 |
| JP | 2003-155914 | 5/2003 |
| JP | 2003-293824 | 10/2003 |
| JP | 2005-155444 | 6/2005 |
| JP | 2005-282545 | 10/2005 |
| JP | 2005-299456 | 10/2005 |
| JP | 2006-177188 | 7/2006 |

OTHER PUBLICATIONS

Patent Abstracts of Japan, Publication No. 03-233125, Published Oct. 17, 1991.
Patent Abstracts of Japan, Publication No. 2006-177188, Published Jul. 6, 2006.
International Search Report of International Application No. PCT/JP2008/050335 (mailed Mar. 4, 2008).

* cited by examiner

EXHAUST EMISSION PURIFICATION METHOD AND EXHAUST EMISSION PURIFICATION SYSTEM

CROSS REFERENCE TO RELATED APPLICATIONS

This application claims the benefit under U.S.C. Section 371, of PCT International Publication No. PCT/JP2008/050335, filed Jan. 15, 2008 and Japanese Application No. 2007-052973 filed Mar. 2, 2007, the contents of which are incorporated herein by reference.

BACKGROUND OF THE INVENTION

The present invention relates to an exhaust emission purification method and an exhaust emission purification system, in an internal combustion engine mounted on a vehicle, provided with a diesel particulate filter (DPF), in the exhaust gas passage thereof, for which forced regeneration is performed in both of a manual regeneration mode and an automatic regeneration mode.

There is a continuous purification type DPF device as one of exhaust gas purification devices which collect particulate matter (PM) discharged from diesel engines by a filter.

In this continuous purification type DPF device, the PM collected by the DPF is continuously burned and purified and thereby the DPF will self-regenerate, while the exhaust gas temperature is approximately 350° C. or greater. However, when the temperature of exhaust gas, accompanied by low speed/low load or the like is low, the temperature of catalyst drops and the catalyst becomes inactive, so that difficulties arise in oxidizing the PM to enable self-regenerating of the filter. Accordingly, due to the accumulation of PM in the filter, clogging thereof is accelerated in the filter. Therefore, the increase of exhaust gas pressure due to the filter clogging becomes a problem.

Such being the case, when the amount of PM in the filter has exceeded a predetermined amount (threshold), exhaust gas temperature is forcibly raised by means of multi injection (multistage delay injection) or post-injection in a cylinder. Thus, a forced regeneration is performed such that thereby the collected PM is forcibly removed through being burned. By the forced regeneration, hydrocarbon (HC), supplied in the exhaust gas by post-injection or the like, burns at the oxidation catalyst installed on the upstream side of the filter or the oxidation catalyst supported on the filter. With this, the temperature of the exhaust gas is raised at the inlet or on the surface of the filter by utilizing oxidative reaction heat. The exhaust gas raises the temperature of the filter exceeding a temperature at which the PM accumulated on the filter is burned and thus the PM is removed.

The forced regeneration has two modes; i.e., manual regeneration mode and automatic regeneration mode. In the manual regeneration mode, when the clogging on the filter exceeds a predetermined amount, an alarm is issued to a driver. Receiving the alarm, the driver pushes a button for starting the forced regeneration to carry out the forced regeneration. On the other hand, in the automatic regeneration mode, when the clogging on the filter exceeds a predetermined amount, the forced regeneration is carried out without issuing any particular alarm to the driver. In this mode, the forced regeneration is carried out in an automatic mode even when the vehicle is running.

As an example of the manual regeneration, for example, an exhaust gas purification device provided with a forced regeneration means and an operation means (regeneration button) has been proposed (for example, refer to patent document 1). The forced regeneration means forcibly burns particulates collected by a particulate filter (DPF) to remove the same and purify the particulate filter. The operation means is provided on the driver's side to allow a driver to operate the forced regeneration means.

Also, there has been proposed another exhaust gas purification device provided with an indicator lamp (for example, refer to patent document 2). When particulates are accumulated on a particulate filter (DPF) exceeding a threshold at which the purification is required, and at the same time when the temperature of the particulate filter exceeds purification start temperature, the indicator lamp flashes to urge a driver to carry out regeneration of the particulate filter. When the driver operates a regeneration switch, particulates collected on the particulate filter are forcibly burned and removed therefrom. Thus, the particulate filter is regenerated.

With the manual regeneration, a problem that engine oil (lubrication oil) is diluted with unburned fuel, which is supplied by post-injection, and mixed with engine oil (lubrication oil) at the forced regeneration during running; i.e., a problem of oil dilution can be solved. Also, automatic regeneration, which is performed when the problem of oil dilution does not occur, reduces the frequency of the manual regeneration. Therefore, a burden on a driver to input a regeneration control start signal (bring the vehicle to a stop, push of regeneration button or the like) in the case of manual regeneration, can be reduced.

On the other hand, because of various states of operation of the vehicle, there may be cases of urgency regeneration (emergency regeneration). The cases are the case where the DPF is not regenerated satisfactorily even after performing forced regeneration such as manual regeneration or automatic regeneration, and forced regeneration is subsequently carried out; and a case where a large amount of PM is produced from the engine, so that the forced regeneration is carried out so as to cope with the situation.

More specifically, there are the following cases in which the forced regeneration is performed. First case is forced regeneration when judgment is made that the purification is insufficient after ending the purification. Second case is forced regeneration after the time has expired before completing of forced regeneration. And third case is forced regeneration when the pressure difference across the diesel particulate filter exceeds a predetermined judging pressure difference under a state where the traveling distance of vehicle is shorter than a predetermined distance for judgment.

Conventionally, an alarm lamp (DPF LAMP) is provided to issue an alarm in the case of emergency regeneration. The lamp is turned on or flashes to alert a driver to carry out manual regeneration without entering into automatic regeneration. Receiving the alarm, the driver brings the vehicle into a stop and pushes the regeneration button to give a designation to start the manual regeneration. Receiving the designation, a control device performs the manual regeneration.

However, the manual regeneration has a problem such that, upon receiving the alarm, the driver has to carry out steps to bring the vehicle into a stop and then push the manual regeneration button. Therefore, the driver may feel it burdensome. Also, since the manual regeneration is emergency regeneration, there is a problem that, when only the manual regeneration is used, it may cause the following considerable trouble. That is, regardless of the situation that urgently requires carrying out the forced regeneration, when the driver ignores the alarm and does not carry out the manual regeneration, clogging progresses on the DPF.

Patent document 1: Japanese Patent Application Kokai Publication No. 2005-155444

Patent document 2: Japanese Patent Application Kokai Publication No. 2003-155914

SUMMARY OF THE INVENTION

The invention has been proposed to solve the above problems. It is an object of the invention to provide an exhaust emission purification method and an exhaust emission purification system, in the forced regeneration of a DPF for purifying PM contained in the exhaust gas, allowing a control to be performed following control when performing the emergency regeneration. The control is such that there is issued an alarm urging a driver to carry out the manual regeneration, and the automatic regeneration is carried out under a predetermined condition, thereby, even when the manual regeneration is not selected, the forced regeneration is reliably performed; thereby a burden on a driver is reduced and convenience is enhanced.

An exhaust emission, purification method for achieving the above object is a method of exhaust emission purification for an exhaust emission purification system, in an internal combustion engine mounted on a vehicle, provided with an exhaust gas purification device having a diesel particulate filter in the exhaust gas passage thereof, wherein, in the case of emergency regeneration, i.e. any one of the following forced generation, after an alarm for urging manual regeneration is issued, manual regeneration is performed when manual regeneration is designated, and automatic regeneration is performed when predetermined conditions are satisfied without the reception of a designation of manual regeneration. First is forced regeneration after a judgment is made that purification is insufficient in purification judgment after ending forced regeneration. Second is forced regeneration after time has expired before completing of forced regeneration. Third is forced regeneration when the pressure difference across a DPF exceeds a predetermined first judging pressure difference under a state where the traveling distance of a vehicle is shorter than a predetermined distance for judgment.

The above method of exhaust emission purification is characterized in that the alarm is to be issued by turning on or flashing an alarm lamp, and the predetermined conditions are anyone of cases as follows: in case a driver inputs designation of automatic regeneration; a predetermined time has expired after the alarm urging manual regeneration is issued; and the pressure difference across the diesel particulate filter is larger than a predetermined second judgment differential pressure. As the predetermined conditions, the following conditions may be employed; i.e., the manual regeneration button is not operated, running or stoppage is continued, the accelerator is operated and the like.

An exhaust emission purification system for achieving the above object is an exhaust emission purification system, including: an exhaust gas purification device having a diesel particulate filter in an exhaust gas passage of an internal combustion engine mounted on a vehicle; and a control device for performing forced regeneration for regenerating of the exhaust gas purification device, wherein the control device is so constituted that in case of emergency regeneration, i.e. any one of forced regeneration after a judgment is made that purification is insufficient in purification judgment after ending forced regeneration, forced regeneration after time has expired before completing of forced regeneration, or forced regeneration when the pressure difference across a DPF exceeds a predetermined first judging pressure difference under a state where the traveling distance of a vehicle is shorter than a predetermined distance for judgment, after an alarm for urging manual regeneration is issued, manual regeneration is performed thereafter when manual regeneration is designated, and automatic regeneration is performed thereafter when predetermined conditions are satisfied without the reception of a designation of manual regeneration.

The above exhaust emission purification system is so configured that the alarm is to be issued by turning on or flashing of an alarm lamp, and the predetermined condition are any one of cases as follows; in case where automatic regeneration is designated by a driver's input; in case where a predetermined time has expired after the alarm for urging manual regeneration is issued; and in case where the pressure difference across said diesel particulate filter exceeds a predetermined second judging pressure difference.

As an example of the exhaust emission purification system, one is an exhaust emission purification system provided with an exhaust gas purification device in which an oxidation catalyst device supporting oxidation catalyst and a DPF are disposed in an exhaust gas passage of an internal combustion engine from the upstream side in order. Another is an exhaust emission purification system provided with an exhaust gas purification device in which a DPF with oxidation catalyst is disposed in an exhaust gas passage of an internal combustion engine.

In an exhaust emission purification method and an exhaust emission purification system according to the invention, the control is performed following. In forced regeneration of a DPF for removing PM contained in exhaust gas, when performing emergency regeneration, an alarm urging a driver to carry out manual regeneration is issued, while automatic regeneration is also performed under a predetermined condition. Therefore, even when manual regeneration is not selected, the forced regeneration is reliably performed. Thus, a burden on the driver is reduced and convenience is increased.

DESCRIPTION OF THE EMBODIMENTS

Figure 1:
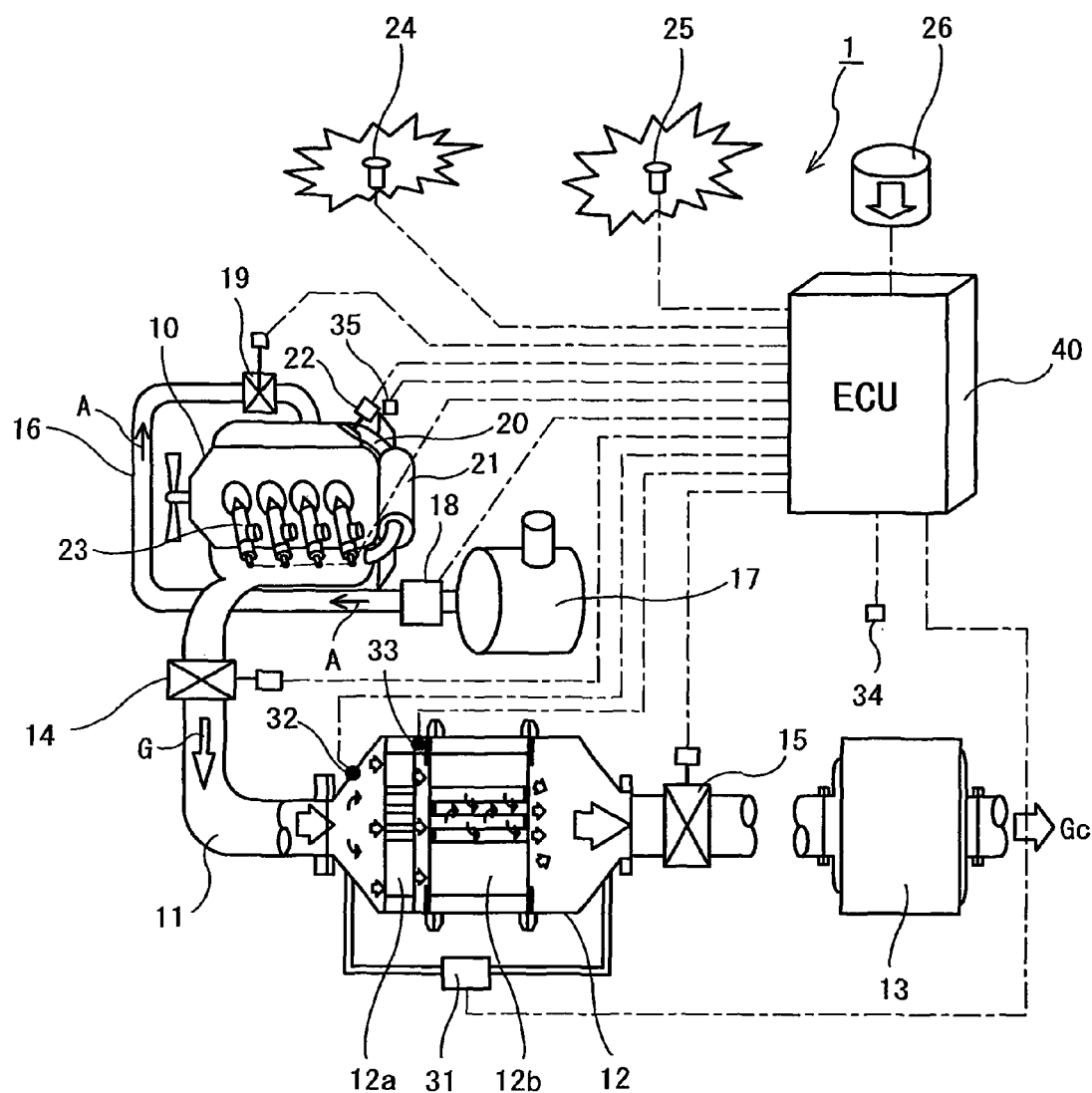
FIG. 1 illustrates an exhaust emission purification system according to an embodiment of the invention.

An exhaust emission purification method and an exhaust emission purification system according to an embodiment of the invention will be described below with reference to the drawings. FIG. 1 illustrates the configuration of an exhaust emission purification system 1 according to an embodiment of the invention.

The exhaust emission purification system 1 includes an exhaust gas purification device 12 and a silencer 13 in an exhaust gas passage 11 of a diesel engine (internal combustion engine) 10. The exhaust gas purification device 12 is a continuous purification type diesel particulate filter (DPF) device that includes an oxidation catalyst device 12a disposed on the upstream side thereof and a filter device 12b with catalyst (DPF) disposed at the downstream side thereof.

The oxidation catalyst device 12a is formed so as to support an oxidation catalyst like platinum on a support such as a porous ceramic having a honeycomb structure or the like.

The filter device 12b with catalyst is formed of a monolithic honeycomb type wall-flow type monolith honeycomb, in which inlets and outlets of honeycomb channels of the porous ceramic are shielded alternately. A platinum, cerium oxide or the like is supported on this filter portion as catalyst. PM (particulate matter) contained in the exhaust gas G is collected (trapped) by the wall of a porous ceramic.

A differential pressure sensor 31 is installed on the conduit tube in front of and behind the exhaust gas purification device 12 in order to estimate the collecting quantity of PM on the filter device 12b with catalyst. An exhaust brake valve 14 is provided on the upstream side of the exhaust gas purification device 12 and an exhaust throttle valve 15 is provided on the downstream side thereof.

An intake air passage 16 is provided with an air cleaner 17, an MAF sensor (intake air amount sensor) 18 and an intake air throttle valve 19. The intake air throttle valve 19 adjusts the amount of the intake air "A" entering into an intake air manifold. An EGR passage 20 is provided with an EGR cooler 21 and an EGR valve 22 that adjust the EGR amount.

For the purpose of the forced regeneration control of the filter device 12b with catalyst, an oxidation catalyst inlet exhaust gas temperature sensor 32 is provided at the upstream side of the oxidation catalyst device 12a, and a filter inlet exhaust gas temperature sensor 33 is provided between the oxidation catalyst device 12a and the filter device 12b with catalyst. The oxidation catalyst inlet exhaust gas temperature sensor 32 detects exhaust gas temperature $Tg1$ at the oxidation catalyst inlet as the temperature of the exhaust gas flowing into the oxidation catalyst device 12a. The filter inlet exhaust gas temperature sensor 33 detects exhaust gas temperature $Tg2$ at the filter inlet as the temperature of the exhaust gas flowing into the filter device 12b with catalyst.

Output values from these sensors are input to a control device (ECU: engine control Unit) 40. In addition to controlling the total operation of the engine 10 the control unit also performs the forced regeneration control for the exhaust gas purification device 12. In accordance with the control signals which are output from the control device 40, the exhaust brake valve 14, the exhaust throttle valve 15, the intake air throttle valve 12, the EGR valve 22, fuel injection devices (injection nozzles) 23 and the like are also controlled.

The fuel injection device 23 is connected to a common rail injection system (not shown) that temporarily reserves a high-pressure fuel pressurized by a fuel pump (not shown). In order to control the engine 10, the control device 40 receives information of accelerator opening from an accelerator position sensor (APS) 34 and information of engine speed from a engine speed sensor 35, vehicle speed and temperature of cooling water. Further, the control device 40 outputs a power-on signal so that predetermined amount fuel is injected from the fuel injection device 23.

Further, a DPF lamp 24, an emergency lamp 25 and a manual regeneration button 26 are provided. These lamps 24 and 25 are alarms to alert a driver when collected amount of the PM on the filter device 12b with catalyst exceeds a predetermined level and the filter device 12b with catalyst is clogged. That is, these alarms alert the driver to stop the vehicle at a convenient time to carry out the forced regeneration. With this, while the vehicle is running, the exhaust gas purification device 12 is controlled to perform the forced regeneration not only in automatic mode but also in manual mode.

The exhaust emission purification system 1 is controlled to collect the PM during ordinary operation. In the ordinary operation, the exhaust emission purification system 1 monitors whether the forced regeneration should be started or not, and when judged as the forced regeneration should be started, the forced regeneration is carried out. The forced regeneration has two modes; i.e., an automatic regeneration mode in which the forced regeneration is carried out during running; and a manual regeneration mode in which the forced regeneration is started when the driver pushes the manual regeneration button 26 after stopping the vehicle in accordance with the alarm. The above modes are appropriately selected based on the values of travel distance and DPF pressure difference. The manual regeneration solves the problem of oil dilution. The oil dilution is a problem such that, in the automatic regeneration during running, due to post-injection performed in the forced regeneration during running, unburned fuel is mixed with engine oil (lubrication oil) and dilutes the engine oil. The automatic regeneration, which is performed when the problem of oil dilution does not occur, reduces the burden on the driver to input regeneration control start signals (like stopping operation and pushing regeneration button) in the case of the manual regeneration.

In the forced regeneration control, multi-injection (multiple step delay injection) and exhaust throttling (at stoppage) are performed to raise the temperature of the exhaust gas. Further, when the exhaust gas temperature $Tg2$ at the filter inlet, which is detected by the filter inlet exhaust gas temperature sensor 33, or the exhaust gas temperature $Tg1$ at the oxidation catalyst inlet, which is detected by the oxidation catalyst inlet exhaust gas temperature sensor 32, is a predetermined temperature (approximately 250° C.) or more, post-injection is performed. With this, the filter inlet exhaust gas temperature $Tg2$ is raised and the forced regeneration is performed. A regeneration control device for performing the forced regeneration is incorporated in the control device 40.

Since the operation conditions of the vehicle are various, the configuration according to the invention is made such that there are provided countermeasures for the following cases of emergency regeneration; i.e., a case where the DPF is not purified sufficiently by performing the forced regeneration in manual mode or automatic mode and forced regeneration is further carried out, or a case of emergency regeneration where a large amount of PM is generated by the engine and the forced regeneration is carried out to remove the same. That is, under the above-conditions, a manual regeneration urging alarm is issued. And when a designation of manual regeneration is received, the manual regeneration is performed. Or, when a predetermined condition is satisfied before receiving the designation of manual regeneration, automatic regeneration is performed.

That is, in case of the emergency regeneration, i.e. anyone of the following forced regenerations; i.e., forced regeneration after a judgment is made that purification is insufficient in purification judgment after ending forced regeneration, forced regeneration after time has expired before completing of forced regeneration, or forced regeneration when the pressure difference across a DPF exceeds a predetermined first judging pressure difference under a state where the traveling distance of a vehicle is shorter than a predetermined distance for judgment, and when any one of the following predetermined conditions is satisfied, the automatic regeneration is performed. That is, after the DPF lamp 24 is turned on or flashes, the driver inputs a designation of automatic regeneration; a predetermined time has expired; and the pressure difference across the DPF is larger than a predetermined second judgment pressure.

The control of the exhaust emission purification system 1 is described below. In this control, PM is collected during ordinary running. During ordinary running, regeneration timing is monitored, and when it is determined as regeneration timing, the alarm is issued, or automatic regeneration is carried out during running. A known method may be employed for determining whether urging alarm for manual regeneration or automatic regeneration. For example, depending on the transition of operation conditions of the vehicle after the previous forced regeneration, the determination is made as described below. That is, in the case the problem of oil dilution is caused by the forced regeneration during running, it is determined that manual regeneration should be carried out and an alarm is issued; when it is determined the problem of oil dilution does not occur even when the forced regeneration is carried out during running, it is determined to perform the automatic regeneration. In the case of the alarm for manual regeneration, receiving the alarm, the driver stops the vehicle and operates manual regeneration button 26 to carry out the forced regeneration. In the case of the automatic regeneration, the forced regeneration is carried out automatically. The forced regeneration is carried out in accordance with, for example, a flow of the forced regeneration control shown in FIG. 3 as described below.

According to the invention, in addition to the forced regeneration of ordinary manual regeneration and automatic regeneration, a control of emergency regeneration is added. The control of the emergency regeneration is a control performed in accordance with, for example, a control flow shown in FIG. 2. Every time when it is determined whether the emergency regeneration is necessary, or every time when it is determined whether the present forced regeneration is the emergency regeneration during ordinary operation, the control flow of the emergency regeneration in FIG. 2 is called out from upper control flow that controls the ordinary operation and executed in the ordinary running.

Figure 2:
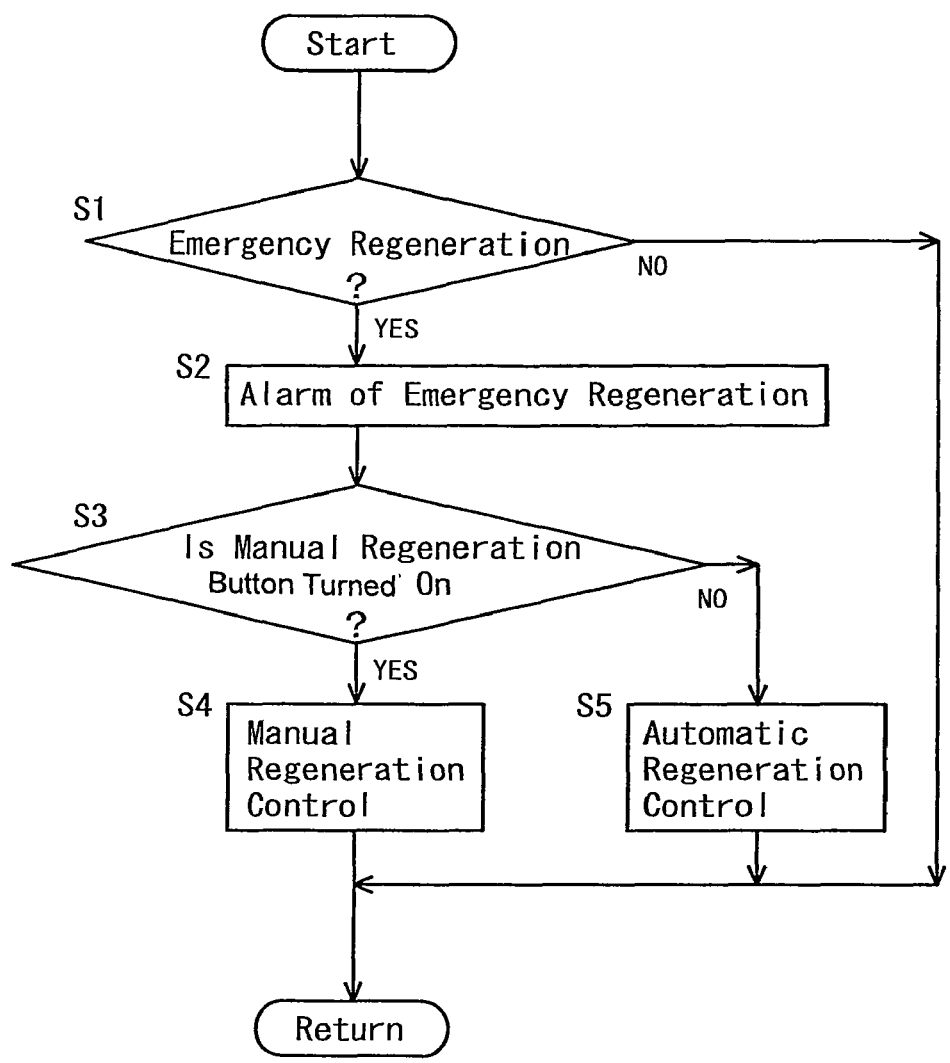
FIG. 2 illustrates an example of a flow of an emergency regeneration control according to an embodiment of the invention.

When the control flow in FIG. 2 is called out and started, at step S1, it is determined whether the operation is emergency regeneration. When any one of the following conditions is determined as "YES", the judgment is made as emergency regeneration; and when every condition is determined as "NO", it is determined as no emergency regeneration. That is, judgment is made whether the regeneration is the forced regeneration after determined as insufficient by a purification judgment after the previous forced regeneration is completed; whether the regeneration is the forced regeneration after the time has expired before the purification is not completed while the temperature of the filter device 12*b* with catalyst is not sufficiently raised yet in the previous forced regeneration; or whether the pressure difference $\Delta P$ across the filter device 12*b* with catalyst is larger than the predetermined first judging pressure difference $\Delta P1$ under a state that the traveling distance $\Delta M$ of the vehicle is smaller than a predetermined distance $\Delta M1$ for judgment after the previous forced regeneration is completed.

When the regeneration is judged as non-emergency regeneration (NO) at step S1, the process proceeds to RETURN and returns to the upper control flow. On the other hand, when the regeneration is judged as emergency regeneration (YES) at step S1, the process proceeds to step S2 and an alarm of emergency regeneration is issued. The alarm urges the manual regeneration. The DPF lamp 24 flashes alerting the driver of the vehicle that the DPF is in the emergency regeneration and urges the driver to select manual regeneration or automatic regeneration. A voice message may be used for the alarm.

To encourage the driver to carry out smoothly the forced regeneration control, a DPF regeneration lamp may be provided and adapted to be turned on or to flash to thereby inform the driver that the DPF is in automatic emergency regeneration. Ordinarily, the DPF regeneration lamp is adapted to be turned on or flash to notify the driver that the DPF is in automatic regeneration. However, the DPF regeneration lamp is adapted so as, during the automatic emergency regeneration, to be turned on or flash only when the conditions permits the post-injection. With this, the driver recognizes the operation conditions that the DPF is regenerated easily. In this case, the driver drives the vehicle so that DPF regeneration lamp is turned on or flashes so that the emergency regeneration is completed more smoothly.

After that, at step S3, it is checked whether or not the manual regeneration button 26 is turned ON. When the manual regeneration button 26 is judged as ON (YES) at step S3, the manual regeneration control is performed at step S4. In the manual regeneration, receiving the ON signal from the manual regeneration button 26, the forced regeneration starts. That is, receiving the emergency regeneration alarm issued at step S2, the driver stops the vehicle and turns ON the manual regeneration button 26 to start the forced regeneration.

The above steps may be adapted as described below. That is, receiving the alarm of emergency regeneration issued at step S2, the driver only selects the manual regeneration or the automatic regeneration at step S3. In this case, after that, the driver stops the vehicle and turns ON the manual regeneration button 26 again. Receiving this, the forced regeneration starts. That is, receiving the ON signal of the manual regeneration button 26, the forced regeneration starts. After completing the manual regeneration control at step S4, the process returns to the upper control flow.

When it is judged that the manual regeneration button is not turned ON (NO) at step S3, the automatic regeneration control is performed at step S5. In the automatic regeneration, receiving the emergency regeneration alarm issued at step S2, the driver preferably drives the vehicle at a high speed suitable for the emergency regeneration. Information about the above step is preferably given in an operation manual of the vehicle.

In the automatic regeneration, when a predetermined condition is satisfied before the designation of the manual regeneration is given, the forced regeneration is carried out. When any one of the following conditions is satisfied, the forced regeneration is carried out. That is, a case that, at step S3, it is checked that the driver turns the manual regeneration button 26 to the automatic regeneration side and the driver has input a designation of the automatic regeneration; a case that, receiving a judgment at step S3 that the manual regeneration button 26 is not turned ON (NO), the fact is checked that a predetermined time has expired from the emission of the alarm; and a case that it is checked that the differential pressure $\Delta P$ across the filter device 12*b* with catalyst, which is detected by the differential pressure sensor 31, is larger than a predetermined second judgment differential pressure $\Delta P2$ ($\Delta P2 > \Delta P1$), which indicates if the PM further acculturates, the engine 10 may get into a trouble. After performing the forced regeneration control at step S5, the process returns to the upper control flow.

Figure 3:
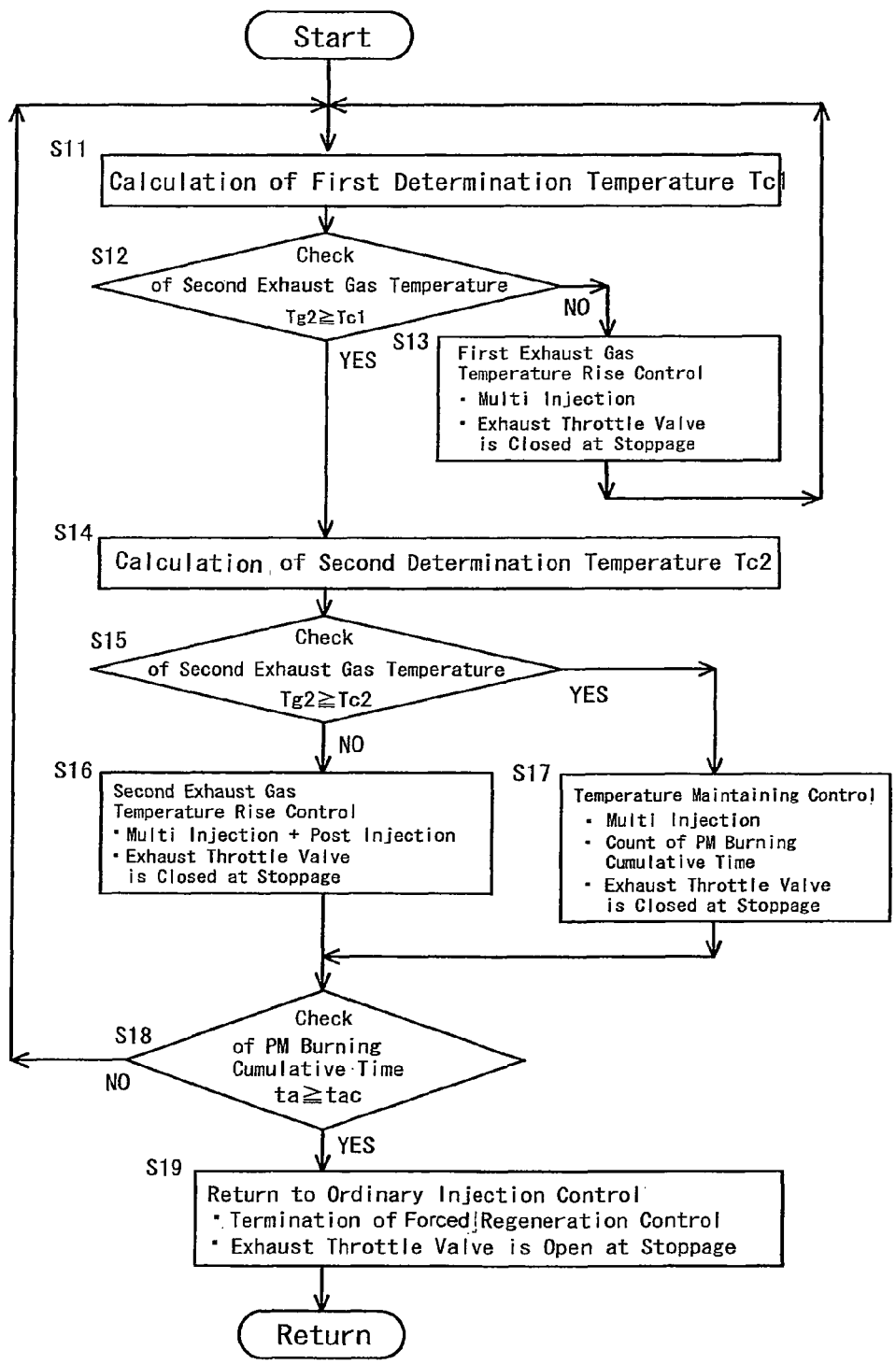
FIG. 3 illustrates an example of control flow of forced regeneration.

The forced regeneration control is performed at steps S4 and S5 in accordance with the control flow shown in FIG. 3. In the control flow in FIG. 3, the second exhaust gas temperature Tg2 detected by the filter inlet exhaust gas temperature sensor 33 is used as the catalyst temperature indicator, which indicates the temperature of the oxidation catalyst (bed temperature). When the second exhaust gas temperature Tg2 is a predetermined first determination temperature Tc1 or more, unburned fuel is supplied to the upstream side of the oxidation catalyst device 12*a* by post-injection. Also, the second exhaust gas temperature Tg2 detected by the filter inlet exhaust gas temperature sensor 33 is used as the filter temperature indicator, which indicates the temperature of the filter device 12b with catalyst. When the second exhaust gas temperature Tg2 is a predetermined second determination temperature Tc2 or more, the temperature maintaining control is performed with multi-injection (multiple-step delay injection) without performing the post-injection.

When the control flow in FIG. 3 is started, the first determination temperature Tc1 is calculated at step S11. The first determination temperature Tc1 is a temperature (for example, approximately 250° C.) such that, when the second exhaust gas temperature (catalyst temperature indicator) Tg2 reaches the temperature, the HC is satisfactorily oxidized by the oxidation catalyst on the oxidation catalyst device 12a. The second exhaust gas temperature Tg2 is the temperature of the exhaust gas detected by the filter inlet exhaust gas temperature sensor 33. The HC is unburned fuel supplied by the post-injection. In place of the first determination temperature Tc1, a value, which changes in proportion to the engine speed Ne, may be used. Further, in place of the second exhaust gas temperature Tg2 detected by the filter inlet exhaust gas temperature sensor 33, the first exhaust gas temperature Tg1, which is detected by the oxidation catalyst inlet exhaust gas temperatures sensor 32, may be used.

At step S12, the second exhaust gas temperature (catalyst temperature indicator) Tg2 is checked. When the second exhaust gas temperature Tg2 is lower than the first determination temperature Tc1 calculated at step S11, the first exhaust gas temperature rise control is performed for a predetermined time (a period of time relevant to an interval of the check of the second exhaust gas temperature Tg2 at step S13) Δt1 at step S13.

In the first exhaust gas temperature rise control, the multi-injection is performed based on a map data for the first multi-injection without performing post-injection. That is, during the multi-injection control, injection amount of the multi-injection and the injection timing are calculated, based on the detected engine speed and the injection amount of the fuel calculated from the detected accelerator opening or the like, referring to a map data for the first multi-injection, and the multi-injection is performed. The map data for first multi-injection for determining the injection amount of the multi-injection and the timing of the injection is a map data based on the engine speed and the injection amount of fuel, that is, the injection amount of fuel calculated based on the detected accelerator opening. The map data is set beforehand based on experiments, calculation or the like, and is input to the control unit. In the multi-injection, the injection amount of the multi-injection is increased, and the injection timing of the multi-injection is delayed to be slower than the fuel injection timing in ordinary running. With this multi-injection, the temperature rise efficiency of the exhaust gas is increased and the temperature of the exhaust gas is raised swiftly.

After completing step S13, the process returns to step S11. When the second exhaust gas temperature Tg2 is judged as higher than a predetermined first determination temperature Tc1 at step S12, the process proceeds to step S14. As the catalyst temperature indicator indicating the temperature of the oxidation catalyst, both of the second exhaust gas temperature Tg2 detected by the filter inlet exhaust gas temperature sensor 33 and the first exhaust gas temperature Tg1 detected by the oxidation catalyst inlet exhaust gas temperature sensor 32 are used; and as predetermined determination temperatures, the first determination temperature Tc1 and a third determination temperature Tc3 may be used. In this case, when the second exhaust gas temperature Tg2 exceeds the first determination temperature Tc1 as well as the first exhaust gas temperature Tg1 exceeds the third determination temperature Tc3, the unburned fuel is supplied at the upstream side of the oxidation catalyst device 12a with the post-injection.

At step S14, the second determination temperature Tc2 is calculated. The second determination temperature Tc2 is the target temperature of the second exhaust gas temperature rise control at step S16. The second exhaust gas temperature (filter temperature indicator) Tg2, which is the temperature of the exhaust gas detected by the filter inlet exhaust gas temperature sensor 33, is maintained higher than the second determination temperature Tc2. Thereby, the PM collected by the filter device 12b with catalyst is maintained to burn in a satisfactory state. The second exhaust gas temperature Tg2 is the temperature of the exhaust gas detected by the filter inlet exhaust gas temperature sensor 33. The second determination temperature Tc2 is ordinarily set to a value higher than the ignition temperature of the PM (for example, approximately 350° C.), for example, to 500° C. The value of the second determination temperature Tc2 may be changed in multi-step as time passes.

At step S15, the second exhaust gas temperature (filter temperature indicator) Tg2 is checked. When the second exhaust gas temperature Tg2 is lower than the second determination temperature Tc2, the process proceeds to the second exhaust gas temperature rise control at step S16. When the second exhaust gas temperature Tg2 is higher than the second determination temperature Tc2, the process proceeds to temperature maintaining control at step S17.

At step S16, the second exhaust gas temperature rise control is performed for a predetermined time Δt2 (a period of time relevant to the interval of the check of the second exhaust gas temperature Tg2 at step S15). In the second exhaust gas temperature rise control, the multi-injection is performed based on a second multi-injection map data, which is different from the first multi-injection map data. The second multi-injection map data for determining the injection amount and the injection timing of the multi-injection is, same as the first multi-injection map data, a map data of the engine speed and the injection amount of fuel, that is, the injection amount of fuel calculated from the detected accelerator opening. The map data is set beforehand based on experiments, calculation or the like, and is input to the control unit.

In the multi-injection, the injection amount of the multi-injection is reduced to an amount necessary for maintaining the temperature of the exhaust gas, and the injection timing of the multi-injection is delayed in a time shorter than the injection timing of the multi-injection first exhaust gas temperature rise control at S13. With this multi-injection, the temperature of the exhaust gas is maintained at a certain level and the fuel is supplied to the oxidation catalyst device 12a with the post-injection; and thus, the fuel is oxidized by the oxidation catalyst. With this, the temperature of the exhaust gas flowing into the filter 12b with catalyst is raised.

With the multi-injection of the second exhaust gas temperature rise control, the temperature of the exhaust gas is maintained to increase and the unburned fuel (HC) is supplied into the exhaust gas with the post-injection. The unburned fuel is oxidized by the oxidation catalyst device 12a, and with the heat due to oxidation, the temperature of the exhaust gas is further raised. When the raised second exhaust gas temperature Tg2 reaches the second determination temperature Tc2 or more, the PM collected by the filter device 12b with catalyst is burned. In the second exhaust gas temperature rise control, the second exhaust gas temperature Tg2 may be raised continuously to the temperature Tc2 as the control target. However the temperature may be raised in two steps or multi-step. After step S16, the process proceeds to step S18.

When it is judged that the second exhaust gas temperature Tg2 gas is higher than the second determination temperature Tc2 at step S15, the temperature maintaining control is executed to perform the multi-injection without post-injection in the injection within the cylinder of the engine 10 for a predetermined time Δt3 (a time relevant to the interval for checking continuous duration of the second exhaust gas temperature Tg2 at step S15) at step S17.

At step S17, accumulative combustion time of PM is counted. In this count, only when the second exhaust gas temperature Tg2 is higher than the predetermined second determination temperature Tc2, the accumulative combustion time of PM ta is counted (ta=ta+Δt3). After completing step S17, the process proceeds to step S18.

At step S18, the accumulative combustion time ta of the PM is checked to judge whether or not the regeneration control is terminated. In this check, it is checked whether or not the accumulative combustion time ta of the PM exceeds a predetermined judgment time Tac. That is, when the accumulative combustion time ta of the PM exceeds a predetermined judgment time Tac, it is determined that the regeneration control is completed, and the process proceeds to step S19. When the accumulative combustion time ta of the PM does not exceed the predetermined judgment time Tac, it is determined that the regeneration control is not completed, and the process returns to step S11. And any one of the first exhaust gas temperature rise control at step S13, the second exhaust gas temperature rise control at step S16 and the temperature maintaining control at step S17 is carried out until the accumulative combustion time ta of the PM exceeds the predetermined judgment time tac.

At step S19, the forced regeneration control is terminated. And when the vehicle is being stopped, the exhaust brake valve 14 and the exhaust throttle valve 15 are returned to ordinary running state and ordinary injection control is restored. After that, the process proceeds to return.

In the forced regeneration control, if the second exhaust gas temperature (catalyst temperature indicator) Tg2 is lower than the predetermined first determination temperature Tc1, the first exhaust gas temperature rise control S13 is executed to perform multi-injection without post-injection in the fuel injection control within the cylinder. When the second exhaust gas temperature Tg2 is higher than the predetermined first determination temperature Tc1, in addition to the multi-injection with the fuel injection control within the cylinder, the second exhaust gas temperature rise control S16 is executed to perform post-injection. The second exhaust gas temperature Tg2 is the temperature of the exhaust gas detected by the filter inlet exhaust gas temperature sensor 33, which is the temperature of the exhaust gas flowing into the filter device 12b with catalyst.

According to the above described exhaust emission purification method and the exhaust emission purification system 1, in the exhaust emission purification method of the exhaust emission purification system 1 provided with the exhaust gas purification device 12 provided with the filter device 12b with catalyst (DPF) in the exhaust gas passage 11 of the engine (internal combustion engine) 10 mounted on a vehicle, in the following emergency regeneration, an alarm urging manual regeneration is issued. After that, receiving a designation of manual regeneration, the manual regeneration is carried out. When a predetermined condition is satisfied without receiving the designation of manual regeneration, the automatic regeneration is carried out. That is, the emergency regeneration is any one of the followings; i.e., the forced regeneration after the purification is judged as insufficient in the purification after completing the previous forced regeneration; the forced regeneration after the time expired before the forced regeneration is completed; and the forced regeneration when the pressure difference ΔP across the filter device 12b with catalyst is larger than the predetermined first judging pressure difference ΔP1 under a state that traveling distance of the vehicle is smaller than a predetermined distance for judgment.

In the exhaust emission purification method, as the alarm, the lamp 24 may be flashed, and the predetermined conditions may be any one of the following; i.e., the driver inputs a designation of automatic regeneration; a predetermined time has expired, and the pressure difference ΔP across the filter device 12b with catalyst is larger than the predetermined second judging pressure difference ΔP2 (>ΔP1).

Therefore, the exhaust emission purification method and the exhaust emission purification system according to the invention controls so that, when performing the emergency regeneration, in the forced regeneration of the filter device 12b with catalyst for removing PM contained in the exhaust gas, the alarm urging a driver to carry out manual regeneration is issued, and under a predetermined condition, automatic regeneration is also carried out. With this, even when manual regeneration is not selected, the forced regeneration is reliably performed; and thereby a burden on a driver is reduced and convenience is increased.

In the above-described embodiments, as the exhaust gas purification device for the exhaust emission purification system, an example in which a combination of the oxidation catalyst device 12a located at the upstream side and the filter 12b with catalyst located at the downstream side is given. However, a filter supporting the oxidation catalyst may be used. Also, as the method to supply unburned fuel (HC) to the upstream side of the oxidation catalyst 12a, the post-injection has been described. However, a method of exhaust tube direct injection, in which an unburned fuel supply device may be disposed in the exhaust gas passage 11 to directly inject the unburned fuel into the exhaust gas passage 11 from the unburned fuel supply device, may be employed.

The exhaust emission purification method and the exhaust emission purification system of the invention, which has the above-described superior effects, can be applied extremely effectively to an exhaust emission purification system provided to an internal combustion engine mounted on a vehicle.

What is claimed is:

1. An exhaust emission purification method for an exhaust emission purification system in an internal combustion engine mounted on a vehicle, the system being provided with an exhaust gas purification device having a diesel particulate filter in an exhaust gas passage of the engine, comprising:
    detecting that ordinary forced regeneration of the exhaust gas purification device is required and, when oil dilution does not occur, performing automatic regeneration;
    detecting that emergency regeneration of the exhaust gas purification device is required;
    issuing an alarm urging manual regeneration when the emergency regeneration is required,
    wherein the alarm includes turning on or flashing of an alarm lamp, and
    wherein the emergency regeneration is required when any one of a judgment that purification of the diesel particulate filter is insufficient after ending the forced regeneration, the forced regeneration has stopped before completion of the forced regeneration, or a pressure difference across the diesel particulate filter exceeds a predetermined first judging pressure difference when a traveling distance of the vehicle is shorter than a predetermined distance;

performing the manual regeneration, when the manual regeneration is designated by a user of the vehicle; or performing automatic regeneration when predetermined conditions are satisfied without the designation of the manual regeneration, wherein the predetermined conditions are any one of the automatic regeneration being designated by the vehicle's user, a predetermined time expiring after issuing the alarm, and the pressure difference across the diesel particulate filter exceeding a predetermined second judging pressure difference, and wherein the emergency regeneration is in addition to the ordinary forced regeneration.

2. An exhaust emission purification system, in an internal combustion engine mounted on a vehicle, comprising:

an exhaust gas purification device having
a diesel particulate filter in an exhaust gas passage of the internal combustion engine, and
a control device for performing, as an ordinary forced regeneration of the exhaust gas purification device, when oil dilution does not occur, an automatic regeneration, wherein said control device issues an alarm for manual regeneration when an emergency regeneration is required, wherein the alarm is issued by turning on or flashing of an alarm lamp, and wherein the emergency regeneration is required when any one of a judgment that purification of the diesel particulate filter is insufficient after ending the forced regeneration, the forced regeneration has stopped before completion of the forced regeneration, or a pressure difference across the diesel particulate filter exceeds a predetermined first judging pressure difference when the traveling distance of the vehicle is shorter than a predetermined distance; and the control device performs the manual regeneration, when the manual regeneration is designated by a user of the vehicle, or performs automatic regeneration when predetermined conditions are satisfied without the designation of the manual regeneration, wherein the predetermined conditions are any one of the automatic regeneration being designated by the vehicle's user, a predetermined time expiring after issuing the alarm, and the pressure difference across the diesel particulate filter exceeding a predetermined second judging pressure difference, and wherein the emergency regeneration is in addition to the ordinary forced regeneration.

3. An exhaust emission purification method for an exhaust emission purification system in an internal combustion engine mounted on a vehicle, the system being provided with an exhaust gas purification device having a diesel particulate filter in an exhaust gas passage of the engine, comprising:

performing, as and ordinary forced regeneration of the exhaust gas purification device, when oil dilution does not occur, automatic regeneration;

issuing an alarm urging manual regeneration when emergency regeneration is required, wherein the emergency regeneration is required when any one of a judgment that purification of the diesel particulate filter is insufficient after ending the forced regeneration, the forced regeneration has stopped before completion of the forced regeneration, or a pressure difference across the diesel particulate filter exceeds a predetermined first judging pressure difference when a traveling distance of the vehicle is shorter than a predetermined distance;

performing the manual regeneration, when the manual regeneration is designated by a user of the vehicle; or performing automatic regeneration when predetermined conditions are satisfied without the designation of the manual regeneration, wherein the predetermined conditions are any one of the automatic regeneration being designated by the vehicle's user, a predetermined time expiring after issuing the alarm, and the pressure difference across the diesel particulate filter exceeding a predetermined second judging pressure difference, and wherein the emergency regeneration is in addition to the ordinary forced regeneration.

4. An exhaust emission purification system, in an internal combustion engine mounted on a vehicle, comprising:

an exhaust gas purification device having
a diesel particulate filter in an exhaust gas passage of the internal combustion engine, and
a control device for performing as an ordinary forced regeneration of the exhaust gas purification device, when oil dilution does not occur, automatic regeneration;

wherein said control device issues an alarm for manual regeneration when emergency regeneration is required, wherein the emergency regeneration is required when any one of a judgment that purification of the diesel particulate filter is insufficient after ending the forced regeneration, the forced regeneration has stopped before completion of the forced regeneration, or a pressure difference across the diesel particulate filter exceeds a predetermined first judging pressure difference when a traveling distance of the vehicle is shorter than a predetermined distance; and the control device performs the manual regeneration, when the manual regeneration is designated by a user of the vehicle, or performs automatic regeneration when predetermined conditions are satisfied without the designation of the manual regeneration, wherein the predetermined conditions are any one of the automatic regeneration being designated by the vehicle's user, a predetermined time expiring after issuing the alarm, and the pressure difference across the diesel particulate filter exceeding a predetermined second judging pressure difference, and wherein the emergency regeneration is in addition to the ordinary forced regeneration.

5. An exhaust emission purification method for an exhaust emission purification system provided with an exhaust gas purification device having a diesel particulate filter in an exhaust gas passage of an internal combustion engine of a vehicle, comprising:

performing, as a first ordinary forced regeneration, when oil dilution does not occur, automatic regeneration;

determining that the first forced regeneration of the diesel particulate filter is terminated, but that the first forced regeneration of the diesel particulate filter is insufficient;

issuing an audible or visual alarm for urging a user of the vehicle to designate a manual regeneration as a second forced regeneration; and performing an automatic regeneration as the second forced regeneration when predetermined conditions are satisfied after the alarm is issued but before the manual regeneration is designated, wherein the second regeneration is in addition to the first regeneration.

6. The method as recited in claim 5, wherein the predetermined conditions are any one of a performance of the automatic regeneration being designated by the vehicle's user; a predetermined time expiring without a performance of the manual regeneration being designated by the vehicle user, and a pressure difference across the diesel particulate filter being equal to or higher than a predetermined pressure difference.

7. An exhaust emission purification system, comprising:
an exhaust gas purification device having
a diesel particulate filter in an exhaust gas passage of an internal combustion engine of a vehicle, and
a control device for performing as a first forced regeneration of the exhaust gas purification device, when oil dilution does not occur, automatic regeneration;
wherein, when termination of a first forced regeneration of the exhaust gas purification device is detected, but the first forced regeneration of the exhaust gas purification device is deemed insufficient, the control device issues an audible or visual alarm for urging a user of the vehicle to designate a manual regeneration as a second forced regeneration, and
wherein the control device performs an automatic regeneration as the second forced regeneration when predetermined conditions are satisfied after the alarm is issued but before the manual regeneration is designated, and
wherein the second regeneration is in addition to the first regeneration.

8. The system as recited in claim 7, wherein the predetermined conditions are any one of a performance of the automatic regeneration being designated by the vehicle's user; a predetermined time expiring without the manual regeneration being designated by the vehicle's user, and a pressure difference across the diesel particulate filter being equal to or higher than a predetermined pressure difference.

9. An exhaust gas purification method for an exhaust purification system in an internal combustion engine of a vehicle, said system including an exhaust gas purification device with a diesel particulate filter in an exhaust gas passage of the internal combustion engine, comprising:
performing, as a first ordinary forced regeneration of the exhaust gas purification device, when oil dilution does not occur, automatic regeneration;
determining that the first forced regeneration of the exhaust gas purification device is terminated but that the first forced regeneration is insufficient;
issuing an alarm for urging a user of the vehicle to use manual regeneration for a second forced regeneration; and
performing an automatic regeneration as the second forced regeneration when predetermined conditions are satisfied after the alarm is issued,
wherein said predetermined conditions are any one of the user designating a performance of the automatic regeneration, a predetermined time passes without the manual regeneration being designated by the user, or a pressure difference across the diesel particulate filter is equal to or higher than a predetermined first pressure difference, and
wherein the second regeneration is in addition to the first regeneration.

10. The method as recited by claim 9, further comprising:
wherein the second forced regeneration is performed after an emergency regeneration which is any one of a determination that the first forced regeneration is insufficient after the first regeneration is terminated, a time for the first forced regeneration expires before the first forced regeneration is completed, or a pressure difference across the diesel particulate filter exceeds a predetermined second pressure difference when a travelling distance of the vehicle is shorter than a predetermined distance for judgment.

11. An exhaust emission purification system, comprising:
an exhaust gas purification device having
a diesel particulate filter in an exhaust gas passage of an internal combustion engine mounted in a vehicle, and
a control device for performing, as a first forced regeneration of the exhaust gas purification device, when oil dilution does not occur, automatic regeneration;
wherein, when it is determined that an emergency regeneration is required, the control device issues an alarm for urging a user of the vehicle to use a manual regeneration as a second forced regeneration, and the control device performs an automatic regeneration as the second forced regeneration when predetermined conditions are satisfied after the alarm is issued,
wherein said predetermined conditions are any one of the user of the vehicle designating the automatic regeneration, a predetermined time passes without the manual regeneration being designated by the user, or a pressure difference across the diesel particulate filter is equal to or higher than a predetermined first pressure difference, and
wherein the second regeneration is in addition to the first regeneration.

12. The system as recited in claim 11, further comprising:
wherein it is determined that an emergency regeneration is required when any one of the determination that the first forced regeneration is insufficient after the first regeneration is terminated, a time for the first forced regeneration expires before the first forced regeneration is completed, or a pressure difference across the diesel particulate filter exceeds a predetermined second pressure difference when a travelling distance of the vehicle is shorter than a predetermined distance for judgment.

* * * * *